(No Model.)
D. ARNDT.
LAWN MOWER.
No. 328,374. Patented Oct. 13, 1885.
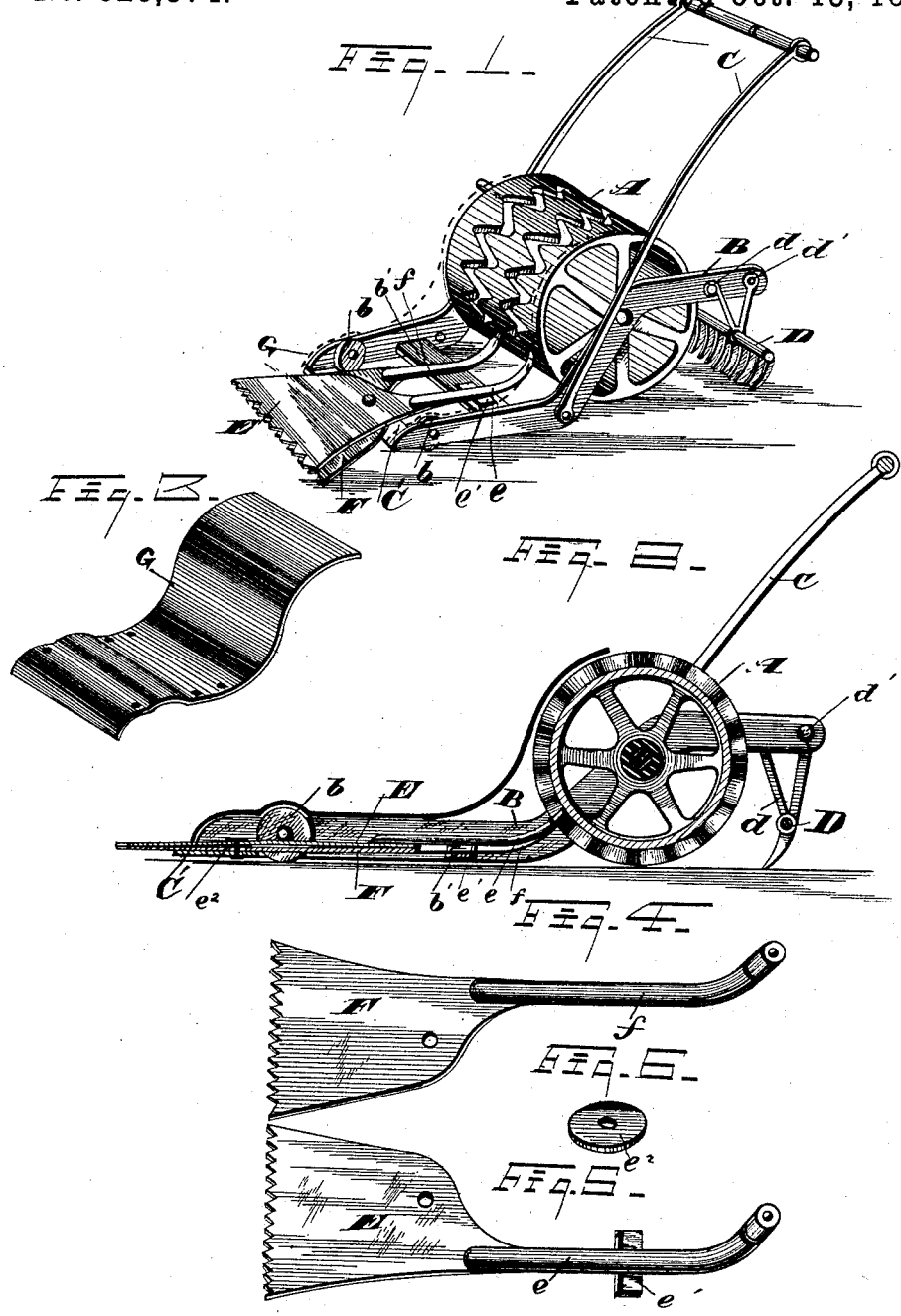
WITNESSES
Wm. M. Monroe,
Geo. W. King
INVENTOR
Daniel Arndt,
by
Leggett & Leggett
Attorneys

UNITED STATES PATENT OFFICE.

DANIEL ARNDT, OF CLEVELAND, OHIO, ASSIGNOR TO AUGUSTE ROMEAU, OF SAME PLACE.

LAWN-MOWER.

SPECIFICATION forming part of Letters Patent No. 328,374, dated October 13, 1885.

Application filed February 7, 1884. Serial No. 120,084. (No model.)

*To all whom it may concern:*

Be it known that I, DANIEL ARNDT, of Cleveland, in the county of Cuyahoga and State of Ohio, have invented certain new and useful Improvements in Lawn-Mowers; and I do hereby declare the following to be a full, clear, and exact description of the invention, such as will enable others skilled in the art to which it pertains to make and use the same.

My invention relates to improvements in a combined lawn-mower and rake attachment; and it consists in certain features of construction and in combination of parts, hereinafter described, and pointed out in the claims.

In the accompanying drawings, Figure 1 is a view in perspective of my improved lawn-mower and rake attachment with the shield G removed. Fig. 2 is a view in longitudinal vertical section of the machine with the shield G in position. Fig. 3 is a view in perspective of the shield. Figs. 4 and 5 are views in elevation of the cutters, and Fig. 6 is a view in perspective of the washer.

A represents a roller journaled in the frame B, and provided on its periphery with cam-grooves. To this frame are attached the handles C, the rake D, and the rollers $b$, and to a cross-bar of the frame C' are pivoted the cutter-blades E and F.

To the cutter-blades are secured, respectively, the arms $e$ and $f$, each provided at the end with a small roller, as shown in Figs. 4 and 5, that engage the cam-grooves on the roller A, by means of which the cutter-blades are reciprocated simultaneously in opposite directions. Having a common pivotal point, a more perfect shearing cut is had than could otherwise be attained.

Each cutter has to move only half as far as it would if operating against the fingers of a stationary cutter-bar, and the cam-groove can therefore be arranged to give each blade twice the reciprocations that would be required of a single blade. By means of this rapid motion the blades have only to cut a small quantity of grass at each reciprocation, and may therefore be operated with little power.

The upper cutter, E, has a friction-plate, $e'$, that slides on the cross-bar $b'$ back of the pivoted point, so that the action of the cam cannot depress the back end of the cutter.

The cutter-plate F has no such support, and is separated from the plate E by a washer, $e^2$, around the pivot, so that the action of the cam pressing down on the lever holds the front end of the plate F against the plate E, so that their respective cutting-edges are always in contact, constituting a valuable feature of the machine.

A shield, G, made of a thin sheet of metal, is secured to the frame B, as shown in Fig. 2, receiving the grass as it is cut. The shield is removably secured to the frame in any suitable manner, so that the shield may easily be lifted from its seat or replaced in position.

What grass escapes the shield will be gathered by the rake. The grass may be dumped in piles as often as necessary, and thus is saved the trouble of raking the ground over.

The rake, by loosening the hooks $d$, may be turned over on the frame B, behind the handles. The rake may easily be removed, if desired, by withdrawing the pivoted pins $d'$.

This machine is found to do its work easily and well, and the construction is such that it can be made at a small initial cost, and is therefore well adapted to supply the wants of a large class that can ill afford the expense of the more costly machines.

What I claim is—

1. In a lawn-mower, the combination, with a frame and a roller journaled therein and provided with cam-grooves, of two cutter-knives having rearwardly-projecting arms, which latter rest within their respective cam-grooves in the roller, and a single pivot-bolt for both cutters, substantially as set forth.

2. In a lawn-mower, the combination, with a frame and a roller journaled therein and provided with cam-grooves, of two cutters having rearwardly-projecting arms, which latter rest within their respective cam-grooves in the roller, a single pivot for both cutters, and friction-plate supporting the upper cutter at a point behind the pivotal point of said cutters, substantially as set forth.

3. In a lawn-mower, the combination, with a frame and the roller having the cam-grooves thereon, of the cutter-knives pivoted to said frame and provided with the rearwardly-extending arms, a washer located between the cutters, and a friction-plate supporting the movable cutter at a point behind the pivotal point of the cutters, substantially as set forth.

4. In a lawn-mower, the combination, with the frame, the roller having cam-grooves therein, and the pivoted cutters having rearwardly-projecting arms, having their ends resting within the cam-grooves, of the shield removably secured to the frame, substantially as set forth.

5. In a lawn-mower, the combination, with the frame, the roller journaled therein, and the pivoted cutters, of the rake secured to the rearwardly-projecting portions of the frame, and the hooks for locking the rake in an operative position, substantially as set forth.

In testimony whereof I sign this specification, in the presence of two witnesses, this 17th day of January, 1884.

DANIEL ARNDT.

Witnesses:
ALBERT E. LYNCH,
CHAS. H. DORER.